US007182302B2

(12) United States Patent
Noniewicz

(10) Patent No.: US 7,182,302 B2
(45) Date of Patent: Feb. 27, 2007

(54) SUPPORT STRUCTURE, ESPECIALLY A ROLLER BRACKET

(75) Inventor: Zbigniew Noniewicz, Kempenich (DE)

(73) Assignee: wolfcraft GmbH, Kempenich (DE)

( * ) Notice: Subject to any disclaimer, the term of this patent is extended or adjusted under 35 U.S.C. 154(b) by 0 days.

(21) Appl. No.: 10/343,875

(22) PCT Filed: Jul. 31, 2001

(86) PCT No.: PCT/EP01/08840

§ 371 (c)(1),
(2), (4) Date: Aug. 19, 2004

(87) PCT Pub. No.: WO02/11954

PCT Pub. Date: Feb. 14, 2002

(65) Prior Publication Data

US 2004/0256525 A1 Dec. 23, 2004

(30) Foreign Application Priority Data

Aug. 3, 2000 (DE) ................................ 100 37 805

(51) Int. Cl.
*F16M 11/20* (2006.01)

(52) U.S. Cl. ...................... 248/164; 248/439; 248/165; 248/166; 198/632; 108/116

(58) Field of Classification Search ................ 248/164, 248/454, 455, 463, 398, 439, 165, 166; 198/632, 198/861.1, 860.1, 313, 581; 193/35 TE; 108/116, 147.19, 147.2, 2, 1, 6
See application file for complete search history.

(56) References Cited

U.S. PATENT DOCUMENTS 738,055 A * 9/1903 Newnam .................... 269/139
3,236,551 A * 2/1966 Culver ........................ 292/11
3,708,141 A * 1/1973 Friedgen et al. ............ 248/515
4,752,047 A * 6/1988 Franks, Jr. ............... 242/129.6
4,879,954 A * 11/1989 Sawamura et al. ............ 108/6
5,108,216 A 4/1992 Geyer et al.
5,219,142 A * 6/1993 Potter ......................... 248/454
5,919,102 A * 7/1999 Smith et al. ................ 473/484
5,979,856 A * 11/1999 Hsu ........................ 248/441.1
6,095,319 A * 8/2000 Noniewicz et al. ......... 198/632
6,179,116 B1 * 1/2001 Noniewicz et al. ......... 198/632
D448,948 S * 10/2001 Wolff .......................... D6/400
6,299,152 B1 * 10/2001 Sangmeister et al. ....... 269/139

FOREIGN PATENT DOCUMENTS

DE 298 08 490 U 1 9/1999
GB 2 042 039 A 9/1980
GB 2 296 938 A 7/1996

* cited by examiner

*Primary Examiner*—Kimberly Wood
(74) *Attorney, Agent, or Firm*—Everest Intellectual Property Law Group; Michael S. Leonard

(57) ABSTRACT

The invention relates to a support structure comprising a support assembly that is supported by legs. The support assembly can be pivoted around a pivoting axis (4) relative to the legs from a position of use to a rest position and can be blocked from pivoting in the position of use by a fixing member. In an advantageous improvement of such a structure, the captivation member is configured as a latch (5) that engages, in the position of use, with a wedge-type blocking surface (8) by means of a spring force, thereby forcing it against a blocking shoulder (9,9').

15 Claims, 6 Drawing Sheets

SUPPORT STRUCTURE, ESPECIALLY A ROLLER BRACKET

CROSS-REFERENCE TO RELATED APPLICATIONS

This application claims priority based on international application number PCT/EP01/08840 filed Jul. 31, 2001 and German patent application number 10037805.6, filed Aug. 3, 2000, and both applications are incorporated by reference in there entirety herein.

BACKGROUND OF THE INVENTION

The present invention relates to a supporting structure having a supporting assembly which is carried by legs, can be pivoted about a pivot pin, in relation to the legs, from a use position into a rest position, and can be blocked against pivoting in the use position by means of a securing member.

A supporting structure in the form of a roller stand is known from DE 298 08 490. In this case, the supporting structure, instead of the rollers extending between side elements, may also have a panel or a fastening frame. The supporting assembly is fitted in a pivotable manner at the end of tubular supports, which merge into legs which allow the supporting structure to be set up in a standing position. The legs can be folded together. By virtue of the supporting assembly being pivoted from a horizontal position into a substantially vertical position, the supporting assembly can be moved into a parallel position in relation to the legs, so that the entire supporting structure can be collapsed in a space-saving manner. The supporting assembly is secured by means of a clamping spindle.

It is an object of the present invention to develop a supporting structure of the mentioned type in a functionally advantageous manner.

SUMMARY OF THE INVENTION

In an embodiment, the present invention provides that the securing member forms a catch. This catch is intended, in the use position, to come into spring-force-activated clamping contact with a blocking shoulder by way of a wedge-shaped blocking surface. As a result of this configuration, the supporting assembly can be pivoted straightforwardly, in handling terms, from a rest position into the use position and is secured there without rattling. The blocking surface engages behind the blocking shoulder. As a result of the wedge-shaped profile of the blocking surface, the engagement takes place with play-free clamping action. The spring-force activation ensures that the catch is pivoted automatically into the blocking position.

It is further provided that the carrying assembly forms two or more pairs of legs. Each pair of legs has two legs which can be pivoted in relation to one another. They can be moved out of a spread-apart position to a parallel position.

It may further be provided that the supporting assembly is height-adjustable. For this purpose, the legs may be of tubular design. Supports which can be displaced telescopically may be plugged into the legs. The ends of the supports can bear the supporting assembly.

It is advantageous if the blocking surface formed by the catch runs helically about the catch bearing.

The supporting assembly may comprise at least two side elements. These preferably L-shaped side elements may form a frame. Each of the two side elements may then be assigned a catch. The catch is preferably located on the inner flank of the side element and is thus disposed in a protective position.

An actuating section may be provided on the outside of the side elements, it being possible for the catch to be displaced from the blocking position into the release position as a result of the actuation of said actuating section.

The blocking shoulder may be formed by a substantially triangular metal plate which is connected to the end of a leg or of a support inserted in a leg.

The actuating section may be a plastics molding which is screwed to the catch.

The blocking surface of the catch may be adjoined by an end flank. It is possible for this end flank, when the supporting assembly is pivoted from the rest position into the use position, to slide on a sliding flank of the metal plate, the sliding flank, together with the blocking shoulder, forming an edge.

Rollers are preferably disposed between the side elements. It is also possible, however, for a supporting panel to be disposed on the side elements, so that the supporting structure can be used as a table. It is preferable, however, for rollers to be located between the side elements, so that the supporting structure forms a roller stand.

Additional features and advantages of the present invention are described in, and will be apparent from, the following Detailed Description of the Invention and the Figures.

BRIEF DESCRIPTION OF THE FIGURES

An exemplary embodiment of the invention is explained hereinbelow with reference to accompanying drawings, in which.

DETAILED DESCRIPTION OF THE INVENTION

Figure 2:
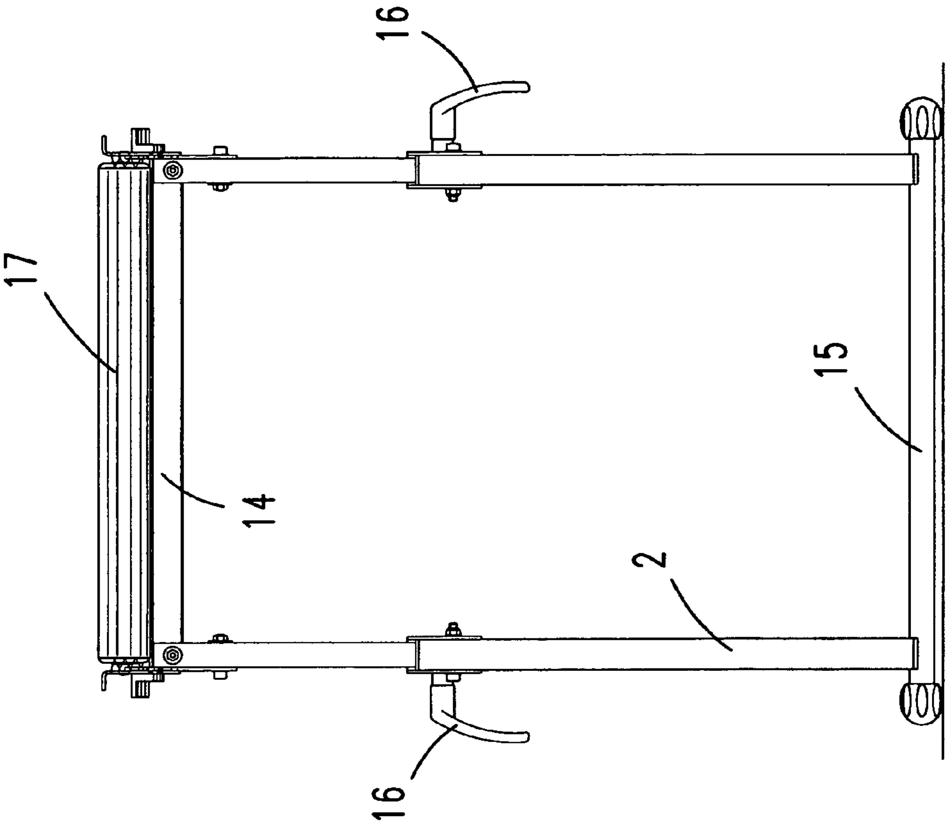
FIG. 2 shows a front view of the supporting structure.
Figure 1:
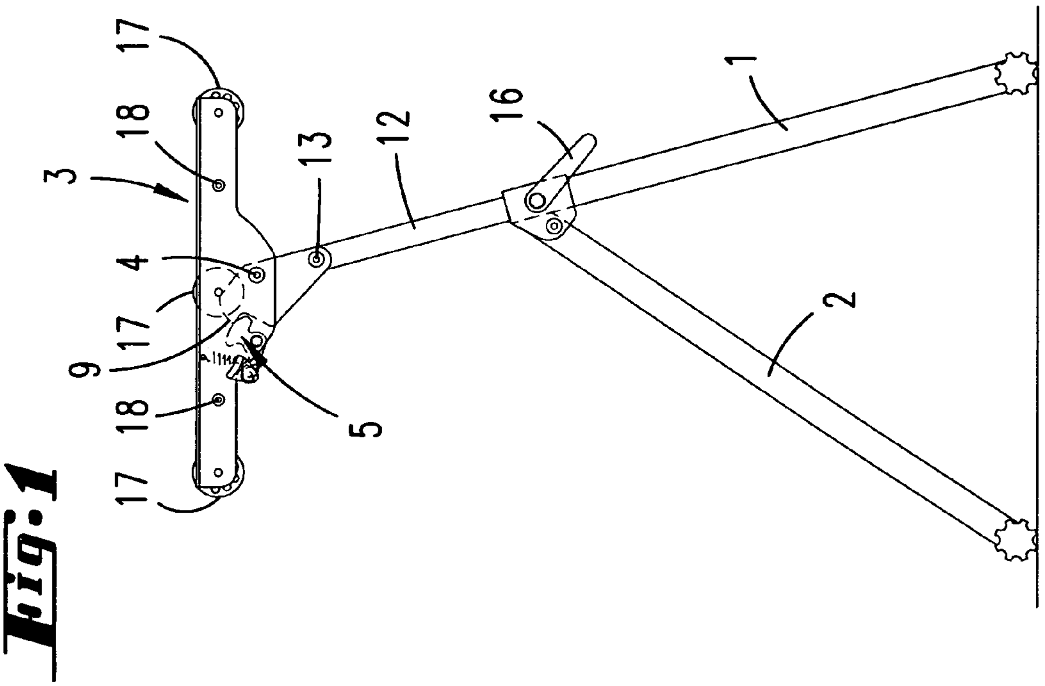
FIG. 1 shows a side view of a supporting structure.
Figure 4:
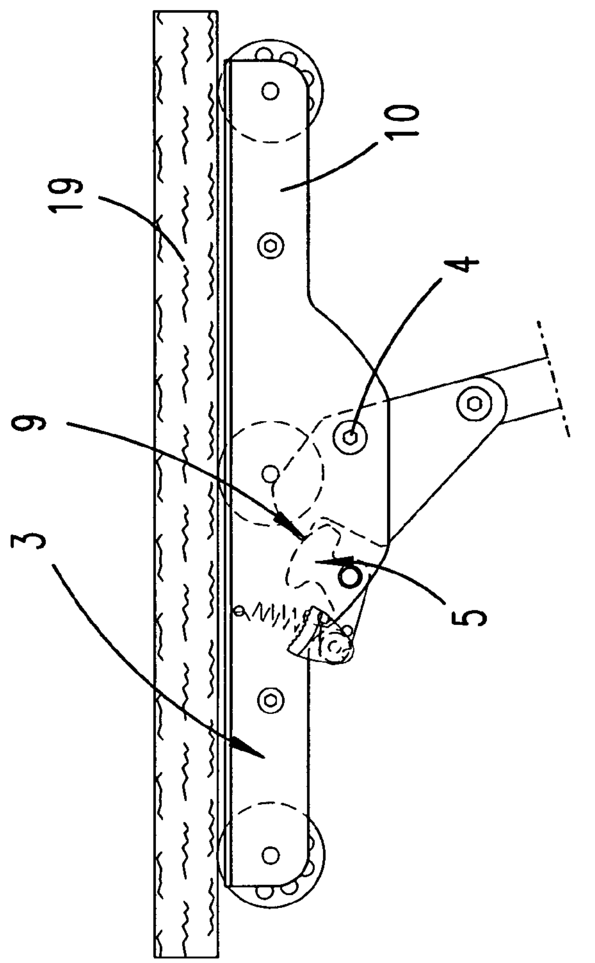
FIG. 4 shows an enlarged illustration of FIG. 1 in the region of the securing member.
Figure 3:
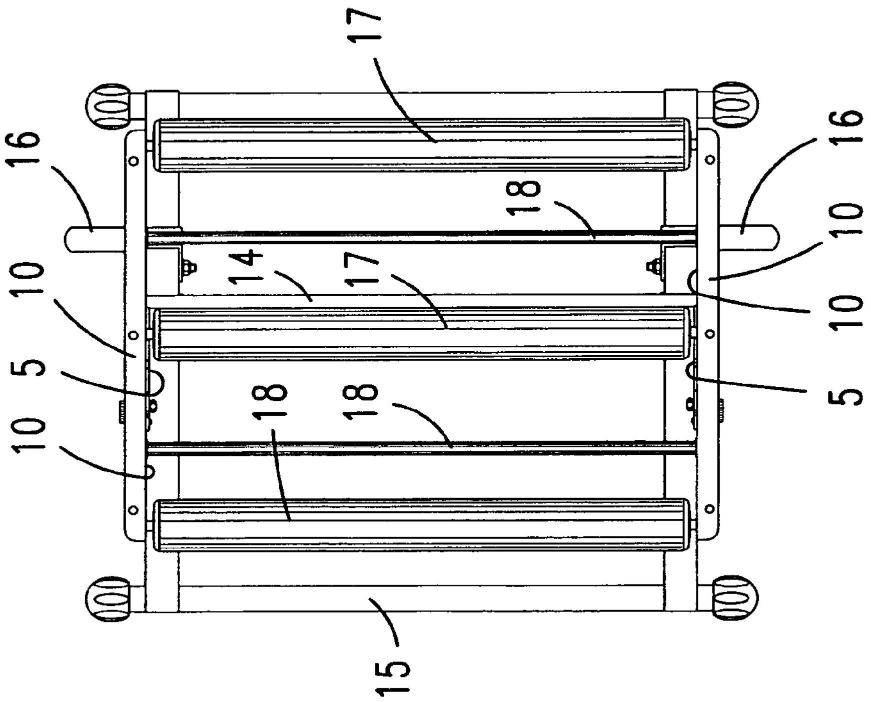
FIG. 3 shows a plan view of the supporting structure.
Figure 5:
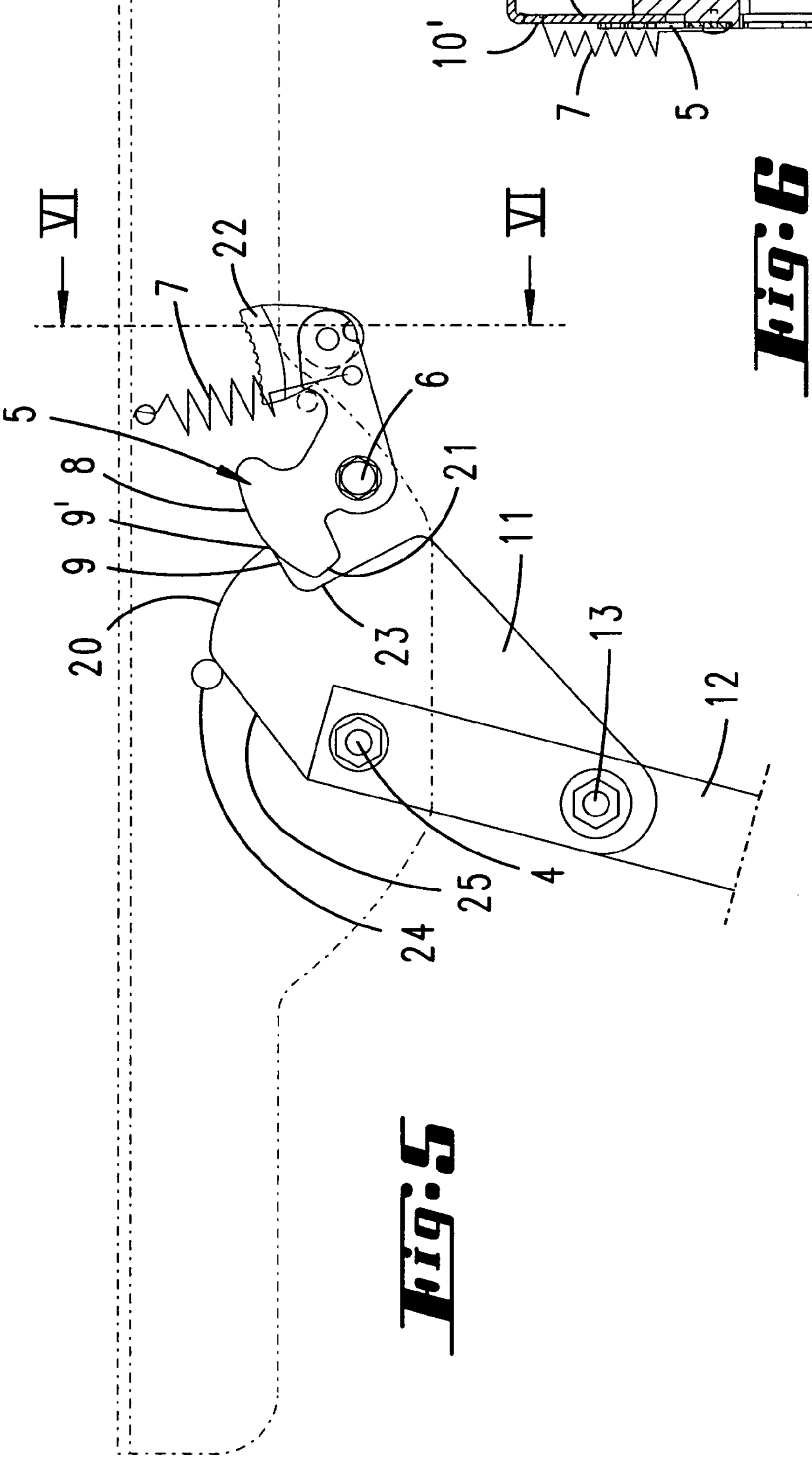
FIG. 5 shows a rear view of a further-enlarged region of the securing member.
Figure 6:
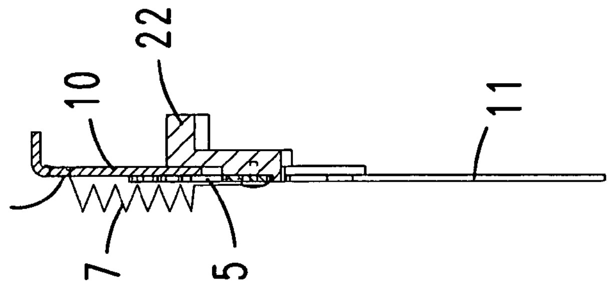
FIG. 6 shows a section along the line VI—VI of FIG. 5.
Figure 7:
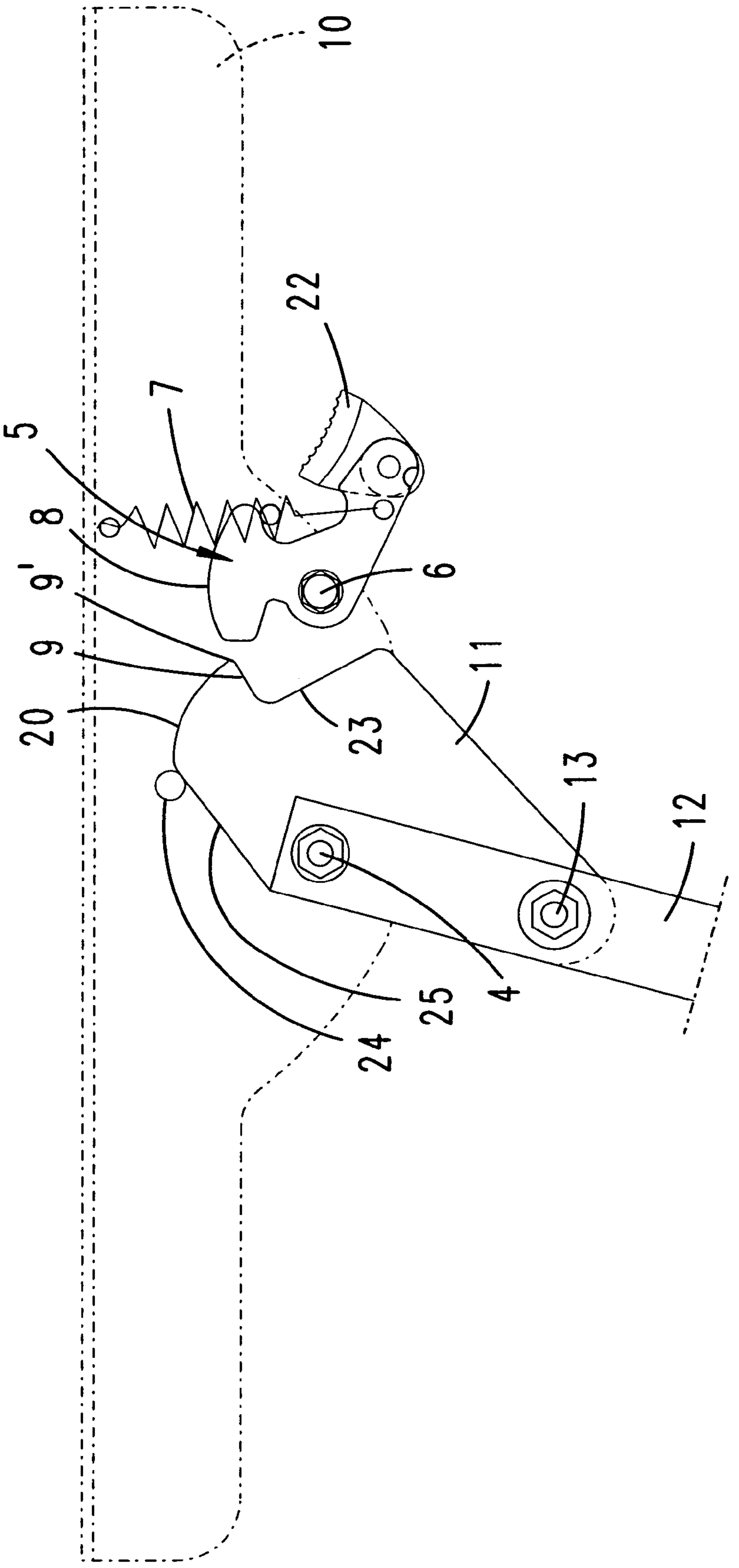
FIG. 7 shows an illustration according to FIG. 5 with the catch disengaged.
Figure 8:
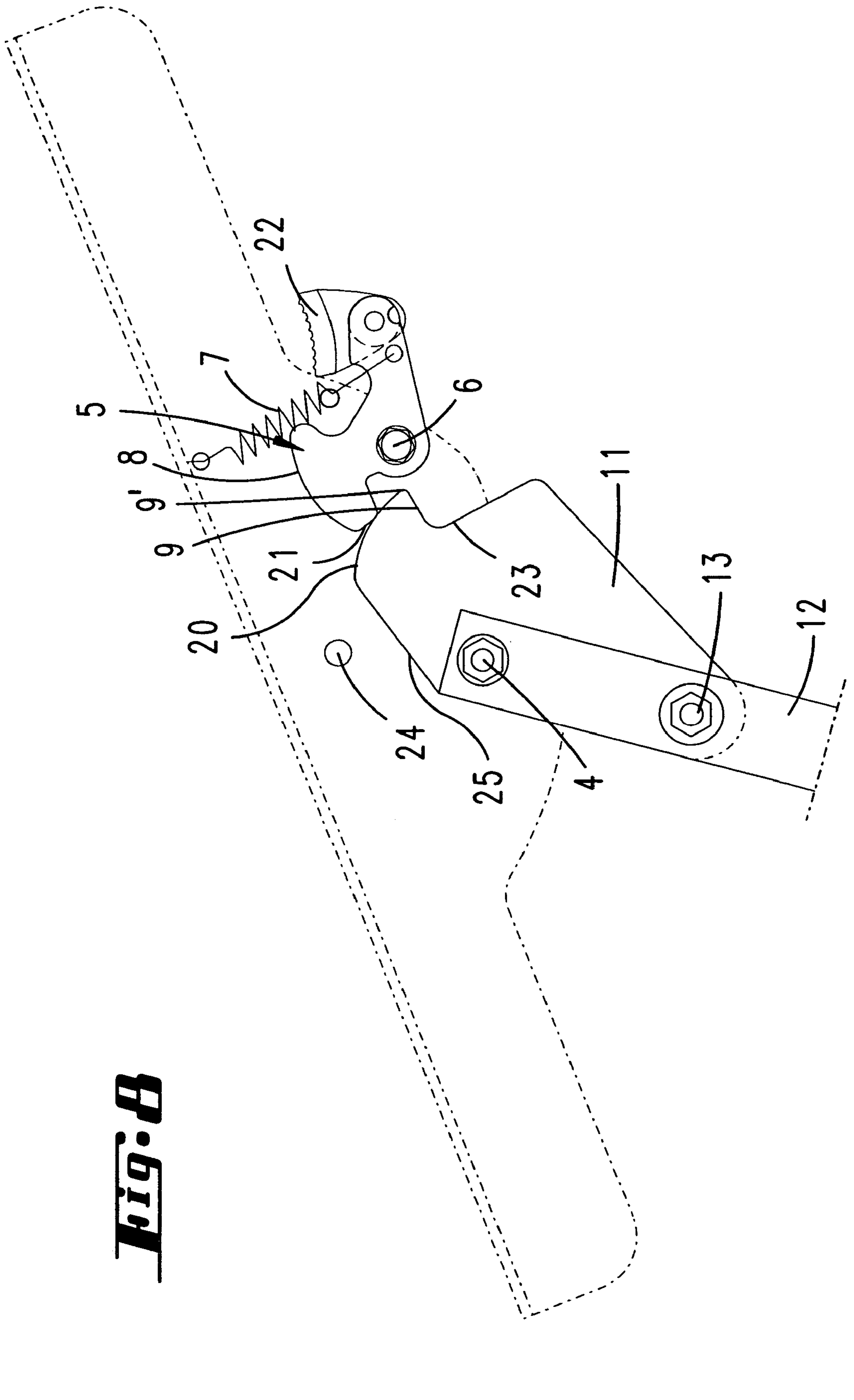
FIG. 8 shows an illustration according to FIG. 5 with the supporting assembly pivoted.

The supporting structure comprises a substructure, which forms two pairs of legs 1, 2. The two pairs of legs 1, 2 are connected to one another and carry a supporting assembly 3. The connection between the supporting assembly 3 and the substructure is provided by a pivoting articulation 4, which is formed as a screw connection, and by a catch 5, which engages beneath a blocking shoulder 9.

The substructure has two pairs of legs 1, 2. The pairs of legs 1, 2 are connected to one another by means of transverse rods 15. The legs 1, 2 of a pair of legs are connected to one another in a pivotable manner, so that the legs 1, 2 can be moved from a spread-apart position into a parallel position in relation to one another. At least the leg 1 is in the form of a tube. The tube has a quadrilateral cross-section. A smaller-diameter tube, which forms a support 12, is plugged into the tube of the leg 1. The support 12 can be secured against displacement in the leg 1 by means of a securing member, which forms a clamping lever 16.

A crossmember 14 is located at the end of the support 12. The crossmember connects the two supports 12. The crossmember 14 is located in the region of the pivot pin 4, about which the supporting assembly 3 can be pivoted from a vertical position into a horizontal position.

A substantially triangular metal plate 11 is also fastened at the end of the support 12, by means of the screw which forms the pivot bearing 4 and of an additional screw connection 13. The metal plate 11 forms a blocking shoulder 9, which merges into a curved sliding flank 20 with an edge 9' being formed in the process.

The supporting assembly 3 forms two spaced-apart side elements 10. The two side elements 10 are connected to one another by means of transverse rods 18. Rollers 17 extend between the side elements 10.

Located on the insides of each of the two side elements 10 is a catch 5, which consists of metal and can be pivoted about a bearing pin 6, which is also the location at which the catch 5 is fastened on the side element 10. The catch 5 forms a blocking surface 8, which forms a helix in relating to the bearing point 6. In the use position, the blocking surface 8 engages beneath the blocking shoulder 9, so that the edge 9' of the blocking shoulder 9 rests on the blocking surface 8. In the clamping position, the end flank 21 of the hammer-head-shaped catch head is spaced apart from an edge 23 of the metal plate 11. The catch 5 has a two-armed design. One arm of the catch 5 forms the head, which has the blocking surface 8. The other arm of the catch 5 has an actuating section 22. This arm is also subjected to the action of the tension spring 7, which forces the blocking surface 8 against the blocking shoulder 9 or the edge 9' formed thereon.

The helical or wedge-like contour of the blocking surface 8 ensures, in conjunction with spring loading thereof, that the parts which make up the securing member, that is to say the metal part 11 and the catch 5, can be produced, and fastened on the side element 10, with large tolerances. Rattle-free fixing is nevertheless ensured.

The actuating section 22 is formed by a plastics molding which is fitted on the outside of the side element and can be actuated there. A small gap is formed between the actuating section 22 and the catch 5, and the sheet-metal side element can penetrate therein.

Figure 9:
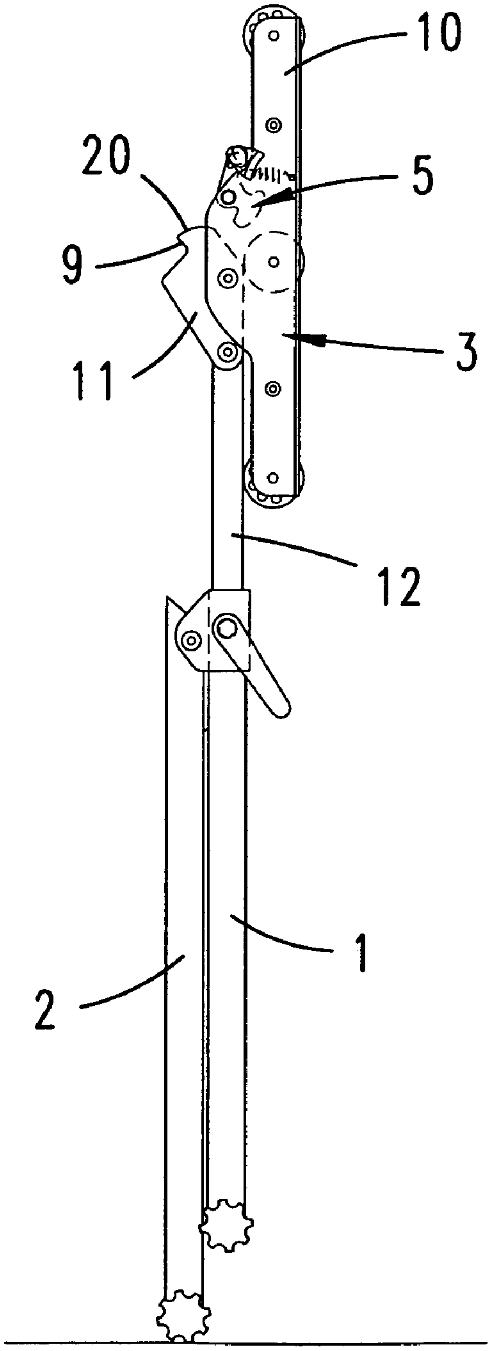
FIG. 9 shows the supporting structure in the collapsed state.

Functioning is as follows. If the supporting assembly is to be moved from the rest position, which is illustrated in FIG. 9, into a use position, then, in the first instance, the two parallel legs 1, 2 are moved into a spread-apart position. This takes place by the legs being pivoted open. The supporting assembly 3, the side elements 10 of which are located parallel to the legs 1, 2, is then pivoted about the pivot pin 4. In this case, the end flank 21 of the catch 5 slides on the sliding flank 20 of the metal plate 11 until it passes over the edge 9'. Once the edge 9' has been passed, a roller spindle 24 strikes against an edge 25 of the metal plate 11, so that the supporting assembly 3, rather than being capable of being pivoted any further, is moved into the horizontal position in a state in which it is blocked against pivoting. The force of the spring 7 ensures that the hammerhead of the catch 5 passes beneath the blocking shoulder 9 until the edge 9' comes into contact with the helical blocking surface 8. The metal plate 11 is then located in a state in which it is fixed, in a force-activated and rattling-free manner, in the horizontal position between the first stop, which is formed by the roller spindle 24, and the second stop, which is formed by the blocking surface 8.

In order to displace the supporting assembly back into the vertical position, all that is then required is for the actuating section 22, which is located on the outside of the side element 10, to be forced downward. The catch 5 then pivots back and the securing action is eliminated.

Although the present invention has been described with reference to specific embodiments, it should be understood that various changes and modifications to the presently preferred embodiments described herein will be apparent to those skilled in the art. Such changes and modifications can be made without departing from the spirit and scope of the present invention and without diminishing without its intended advantages. It is therefore intended that such changes and modifications be covered by the appended claims.

The invention claimed is:

1. A supporting structure, comprising:

a supporting assembly supported by legs;

the supporting assembly having side elements pivotal about respective pivots in relation to the legs from a use position to a rest position;

a plate fixedly connected to one of the legs and having a blocking shoulder;

a securing member blocking the supporting assembly from pivoting when the supporting assembly is in the use position;

the securing member forming a catch on an inside of the side elements, the catch having a wedge-shaped blocking surface biased in contact with the blocking shoulder; and the securing member having an actuating section accessible on an outside of the side elements.

2. A supporting structure according to claim 1, wherein the legs which can be moved from a spread-apart position to a substantially parallel position.

3. A supporting structure according to claim 1, wherein the supporting assembly is height-adjustable.

4. A supporting structure according to claim 1, wherein the blocking surface extends helically about a bearing pin of the catch.

5. A supporting structure according to claim 1, wherein the supporting assembly further comprises a frame which comprises two said side elements which are L-shaped.

6. A supporting structure according to claim 1, wherein the blocking shoulder is fanned by a substantially triangular plate which is connected to an end of a support which is disposed telescopically in a leg member of the legs.

7. A supporting structure according to claim 1, wherein the actuating section comprises a plastic part attached to the catch.

8. A supporting structure according to claim 1, wherein the catch has an end flank adjacent to the blocking surface, and wherein when the supporting assembly is pivoted from the rest position to the use position, the end flank slides on a sliding surface of the blocking shoulder.

9. A supporting structure, comprising:

a supporting assembly supported by legs;

the supporting assembly having side elements pivotal about respective pivots in relation to the legs from a use position to a rest position;

a securing member blocking the supporting assembly from pivoting when the supporting assembly is in the use position;

the securing member forming a catch on an inside of the side elements, the catch having a wedge-shaped blocking surface biased in contact with a blocking shoulder; and the securing member having an actuating section accessible on an outside of the side elements wherein the blocking shoulder is fanned by a substantially triangular plate which is connected to an end of a support which is disposed telescopically in a leg member of the legs.

10. A supporting structure according to claim 9, wherein the legs which can be moved from a spread-apart position to a substantially parallel position.

11. A supporting structure according to claim 9, wherein the supporting assembly is height-adjustable.

12. A supporting structure according to claim 9, wherein the blocking surface extends hectically about a bearing pin of the catch.

13. A supporting structure according to claim 9, wherein the supporting assembly further comprises a frame which comprises two said side elements which are L-shaped.

14. A supporting structure according to claim 9, wherein the actuating section comprises a plastic part attached to the catch.

15. A supporting structure according to claim 9, wherein the catch has an end flank adjacent to the blocking surface, and wherein when the supporting assembly is pivoted from the rest position to the use position, the end flank slides on a sliding surface of the blocking shoulder.

* * * * *